United States Patent
Sheng et al.

(10) Patent No.: US 11,195,634 B2
(45) Date of Patent: Dec. 7, 2021

(54) ANGSTROM-SCALE NANOWIRE ARRAYS IN ZEOLITE

(71) Applicants: The Hong Kong University of Science and Technology, Hong Kong (CN); King Abdullah University of Science and Technology, Thuwal (SA)

(72) Inventors: Ping Sheng, Hong Kong (CN); Bing Zhang, Hong Kong (CN); Zhiping Lai, Thuwal (SA)

(73) Assignees: KING ABDULLAH UNIVERSITY OF SCIENCE AND TECHNOLOGY, Thuwal (SA); THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 301 days.

(21) Appl. No.: 16/287,721

(22) Filed: Feb. 27, 2019

(65) Prior Publication Data

US 2019/0267154 A1  Aug. 29, 2019

Related U.S. Application Data

(60) Provisional application No. 62/636,754, filed on Feb. 28, 2018.

(51) Int. Cl.
  *H01B 1/16* (2006.01)
  *C01B 39/00* (2006.01)
  (Continued)

(52) U.S. Cl.
  CPC ............... *H01B 1/16* (2013.01); *B22F 9/06* (2013.01); *C01B 39/54* (2013.01); *H01B 1/18* (2013.01);
  (Continued)

(58) Field of Classification Search
  CPC ... H01B 1/00; H01B 1/02; H01B 1/16; B82Y 40/00; C01B 39/026; B22F 2301/00; B22F 2304/052
  See application file for complete search history.

(56) References Cited

U.S. PATENT DOCUMENTS

| 10,683,404 B2 * | 6/2020 | Chopra ................... C08J 3/201 |
| 2005/0090387 A1 * | 4/2005 | Niihara .................. B82Y 30/00 502/180 |

(Continued)

FOREIGN PATENT DOCUMENTS

| CN | 102951619 A | 3/2013 |
| CN | 103173832 A | 6/2013 |
| CN | 103290465 B | 7/2016 |

OTHER PUBLICATIONS

Cademartiri et al. "Ultrathin Nanowires—A Materials Chemistry Perspective", Adv. Mater. 2009, 21, 1013-1020.*
(Continued)

*Primary Examiner* — Mark Kopec
(74) *Attorney, Agent, or Firm* — Saliwanchik, Lloyd & Eisenschenk

(57) ABSTRACT

A composite material of Angstrom-scale nanowire arrays in zeolite and its fabrication methods are provided. The zeolite can be prepared by a hydrothermal method and the Angstrom-scale nanowire arrays can be prepared by using zeolite as a template. The zeolite can have porous structures with an average pore size of 0.74 nm and the plurality of nanowires can have an average diameter smaller than 1 nm and can be dispersed on internal or external surfaces of the porous structures. The Angstrom-scale nanowire arrays can be made of aluminum (Al), gallium (Ga), zinc (Zn), or carbon (C). A composite material of the Angstrom-scale
(Continued)

aluminum (Al), gallium (Ga), or zinc (Zn) nanowire arrays in zeolite can exhibit characteristics of one-dimensional (1D) superconductor.

15 Claims, 19 Drawing Sheets

(51) Int. Cl.
  *B22F 9/06* (2006.01)
  *C01B 39/54* (2006.01)
  *H01B 1/18* (2006.01)
(52) U.S. Cl.
  CPC ..... *B22F 2301/052* (2013.01); *B22F 2301/30* (2013.01); *B22F 2304/052* (2013.01)

(56) References Cited

U.S. PATENT DOCUMENTS

| | | |
|---|---|---|
| 2006/0211802 A1* | 9/2006 | Asgari .................. C04B 38/08 524/439 |
| 2016/0258069 A1 | 9/2016 | Nesbitt et al. |
| 2017/0218518 A1 | 8/2017 | Yializis |

OTHER PUBLICATIONS

Romanov "Electronic structure of the minimum-diameter T, Pb and Bi quantum wire superlattices", J. Phys.: Condens. Matter 5, 1081-1090, 1993.*

Bogomolov et al. "Liquids in ultrathin channels (Filament and cluster crystals)", Sov. Phys. Usp. 21(1), Jan. 1978, pp. 77-83.*

Banerjee, P. et al., "Nanotublar metal-insulator-metal capacitor arrays for energy storage," *Nature Nanotechnology*, May 2009, 4:292-296.

Benson, J. et al., "Chemical Vapor Deposition of Aluminum Nanowires on Metal Substrates for Electrical Energy Storage Applications," *ACS NANO*, 2012, 6(1): 118-125, American Chemical Society.

Ding, X. et al., "In situ growth and characterization of Ag and Cu nanowires," *Nanotechnology*, 2006, 17:S376-S380, IOP Publishing Ltd.

Gruev, V., "Fabrication of a dual-layer aluminum nanowires polarization filter array," *Optics Express*, Nov. 21, 2011, 19(24):1-9, Optical Society of America.

Han, J. et al., "Confinement of Supported Metal Catalysts at High Loading in the Mesopore Network of Hierarchical Zeolites, with Access via the Microporous Windows," *ACS Catalysis*, 2018, 8:876-879, American Chemical Society.

Inoue, S. et al., "Formation of Te Nanowires in Zeolite AFI and Their Polarized Absorption Spectra," *International Journal of Modern Physics B*, 2005, 19(15-17):2817-2822, World Scientific Publishing Company.

Jacobsen, C. J. H. et al., "Mesoporous Zeolite Single Crystals," *J. Am. Chem. Soc.*, 2000, 122:7116-7117, American Chemical Society.

Kim, T. et al., "Large Discrete Resistance Jump at Grain Boundary in Copper Nanowire," *Nano Letters*, 2010, 10:3096-3100, American Chemical Society.

Lee, J. W. et al., "Single crystalline aluminum nanowires with ideal resistivity," *Scripta Materialia*, 2010, 63:1009-1012, Elsevier Ltd.

Li, W. et al.. "Magnesium Nanowires: Enhanced Kinetics for Hydrogen Absorption and Desorption," *JACS Communications*, 2007, 129:6710-6711, American Chemical Society.

Ma, C. et al., "Patterned aluminum nanowires produced by electron beam at the surfaces of $AlF_3$ single crystals," *Solid State Communications*, 2004, 129:681-685, Elsevier Ltd.

Makita, T. et al., "Structures and electronic properties of aluminum nanowires," *Journal of Chemical Physics*, Jul. 1, 2003, 119(1):538-546, American Institute of Physics.

Melosh, N. A. et al., "Ultrahigh-Density Nanowire Lattices and Circuits," *Science*, Apr. 4, 2003, 300:112-115.

Rizal, B. et al., "Nanocoax-Based Electrochemical Sensor," *Analytical Chemistry*, 2013, 85:10040-10044, American Chemical Society.

Shanenko, A. A. et al., "Size-dependent enhancement of superconductivity in Al and Sn nanowires: Shape-resonance effect," *Physical Review B*, 2006, 74:1-4, The American Physical Society.

Singh, M. et al., "Synthesis and Superconductivity of Electrochemically Grown Single-Crystal Aluminum Nanowires," *Chemistry of Materials*, 2009, 21:5557-5559, American Chemical Society.

Tolla, F. D. et al., "Electronic properties of ultra-thin aluminum nanowires," *Surface Science*, 2000, 454-456:947-951, Elsevier Science B.V.

Wang, J. J. et al., "30-nm-wide aluminum nanowire grid for ultrahigh contrast and transmittance polarizers made by UV-nanoimprint lithography," *Applied Physics Letters*, 2006, 89:1-4, American Institute of Physics.

Wilson, S. T. et al., "Aluminophosphate Molecular Sieves: A New Class of Microporous Crystalline Inorganic Solids," *J. Am. Chem. Soc.*, 1982, 104:1146-1147, American Chemical Society.

Yin, A. J. et al., "Fabrication of highly ordered metallic nanowire arrays by electrodeposition," *Applied Physics Letters*, Aug. 13, 2001, 79(7):1039-1041, American Institute of Physics.

Yu, R. et al., "Strong Light Absorption of Self-Organized 3-D Nanospike Arrays for Photovoltaic Applications," *ACS NANO*, 2011, 5(11):9291-9298, American Chemical Society.

Zgirski, M. et al., "Quantum fluctuations in ultranarrow superconducting aluminum nanowires," *Physical Review B*, 2008, 77:1-6, The American Physical Society.

Zhang. B. et al., "Giant enhancement of superconductivity in arrays of ultrathin gallium and zinc sub-nanowires embedded in zeolite," *Materials Today Physics*, 2018, 6:38-44, Elsevier Ltd.

* cited by examiner

ANGSTROM-SCALE NANOWIRE ARRAYS IN ZEOLITE

CROSS-REFERENCE TO RELATED APPLICATION

This application claims the benefit of U.S. Provisional Application Ser. No. 62/636,754, filed Feb. 28, 2018, which is hereby incorporated by reference in its entirety including any tables, figures, or drawings.

BACKGROUND

Metal nanowires, such as aluminum nanowires, have received great attention due to their potential applications in manufacturing capacitors, electrochemical biosensors, photovoltaic systems, interconnects, and hydrogen storage. Moreover, when metal nanowires are incorporated to semiconducting nanowires, new functions for metal-semiconductor devices and superconductor-semiconductor devices can be developed.

In recent years, many different methods including chemical vapor deposition, UV lithography, electron-beam lithography, and stress-induced spontaneous growth have been investigated for fabrication of metal nanowires. The diameters of nanowires fabricated by these methods range from several tens of nanometers to a few hundreds of nanometers.

In some investigations, porous anodic aluminum oxide (AAO) was attached to the conductive substrate as templates to synthesize aluminum nanowires for fabricating vertically-oriented aluminum nanowire arrays. For large-scale production of nanowires at low cost, on the other hand, chemical vapor preposition (CVD) is widely employed. However, the aluminum nanowire arrays synthesized by CVD were often disordered.

In some other previously proposed investigations, lithographical method and stress-induced spontaneous growth were also used for fabricating aluminum nanowires. Nevertheless, the average diameters of aluminum nanowires were in the range of several tens to a few hundred nanometers. Moreover, the separation between adjacent aluminum nanowires was of a scale of microns, leading to a rather low density of the aluminum nanowires arrays. As a result, the quantum properties, such as superconductivity, of the aluminum nanowires fabricated were similar to these of the bulk aluminum.

Thus, there is a lack of investigations on methods to fabricate angstrom-scale metal nanowires or angstrom-scale carbon nanowires for superconductivity.

BRIEF SUMMARY

There continues to be a need in the art for improved designs and techniques for Angstrom-scale nanowire arrays that can exhibit superior characteristics as one-dimensional (1D) superconductors.

Embodiments of the subject invention pertain to a composite material of Angstrom-scale nanowire arrays prepared by using zeolite as a template.

According to an embodiment of the invention, a method for fabricating Angstrom-scale aluminum nanowire arrays is provided. The method can comprise mixing aluminum and zeolite crystals with a predetermined weight ratio; heating the mixture under a first predetermined condition(s); cooling down the mixture; heating the mixture under a second predetermined condition(s); and cooling down the mixture to obtain Angstrom-scale aluminum nanowire arrays. The predetermined weight ratio of zeolite crystals and aluminum can be about 1:9. Moreover, the heating the mixture under a first predetermined condition(s) can comprise heating the mixture at about 800° C. under a pressure of about 400 Torr for about 6 hours in an oxygen atmosphere. In addition, the heating the mixture under a second predetermined condition(s) can comprise heating the mixture at a temperature in a range between about 660° C. and about 900° C. under a pressure in a range between 100 Torr and about 1600 Torr for about 3 hours in an inert gas atmosphere. The Angstrom-scale aluminum nanowire arrays obtained can have an average diameter smaller than 1 nm.

In another embodiment, a method for preparing Angstrom-scale metal nanowire arrays by using zeolite crystals as templates is provided. The method can comprise mixing liquid metal and zeolite crystals; heating the mixture under a first predetermined condition(s); and cooling down the mixture to obtain Angstrom-scale metal nanowire arrays. When the liquid metal is gallium (Ga), the mixture can be heated at a temperature of about 80° C. under a pressure smaller than 100 bar. Moreover, when the liquid metal is zinc (Zn), the mixture can be heated at a temperature of about 500° C. under a pressure smaller than 100 bar. Furthermore, the cooling down the mixture can comprise cooling down the mixture by liquid nitrogen.

In another embodiment, a method for preparing Angstrom-scale carbon nanowire arrays using zeolite crystals as templates is provided. The method can comprise mixing methane ($CH_4$) and zeolite crystals; heating the mixture under a first predetermined condition(s); and cooling down the mixture to obtain the Angstrom-scale carbon nanowire arrays. The heating the mixture under a first predetermined condition(s) can comprise heating the mixture at a temperature of about 1000° C. under a pressure of about 6 atmospheres for about 10 hours.

In another embodiment, a composite material of Angstrom-scale nanowires in zeolite can comprise zeolite having porous structures; and a plurality of nanowires having an average diameter smaller than 1 nm and dispersed on internal or external surfaces of the porous structures. The plurality of nanowires is made of any one of aluminum (Al), gallium (Ga), zinc (Zn), and carbon (C). Moreover, the porous structures can have an average pore size of about 0.74 nm.

DETAILED DESCRIPTION

Figure 1:
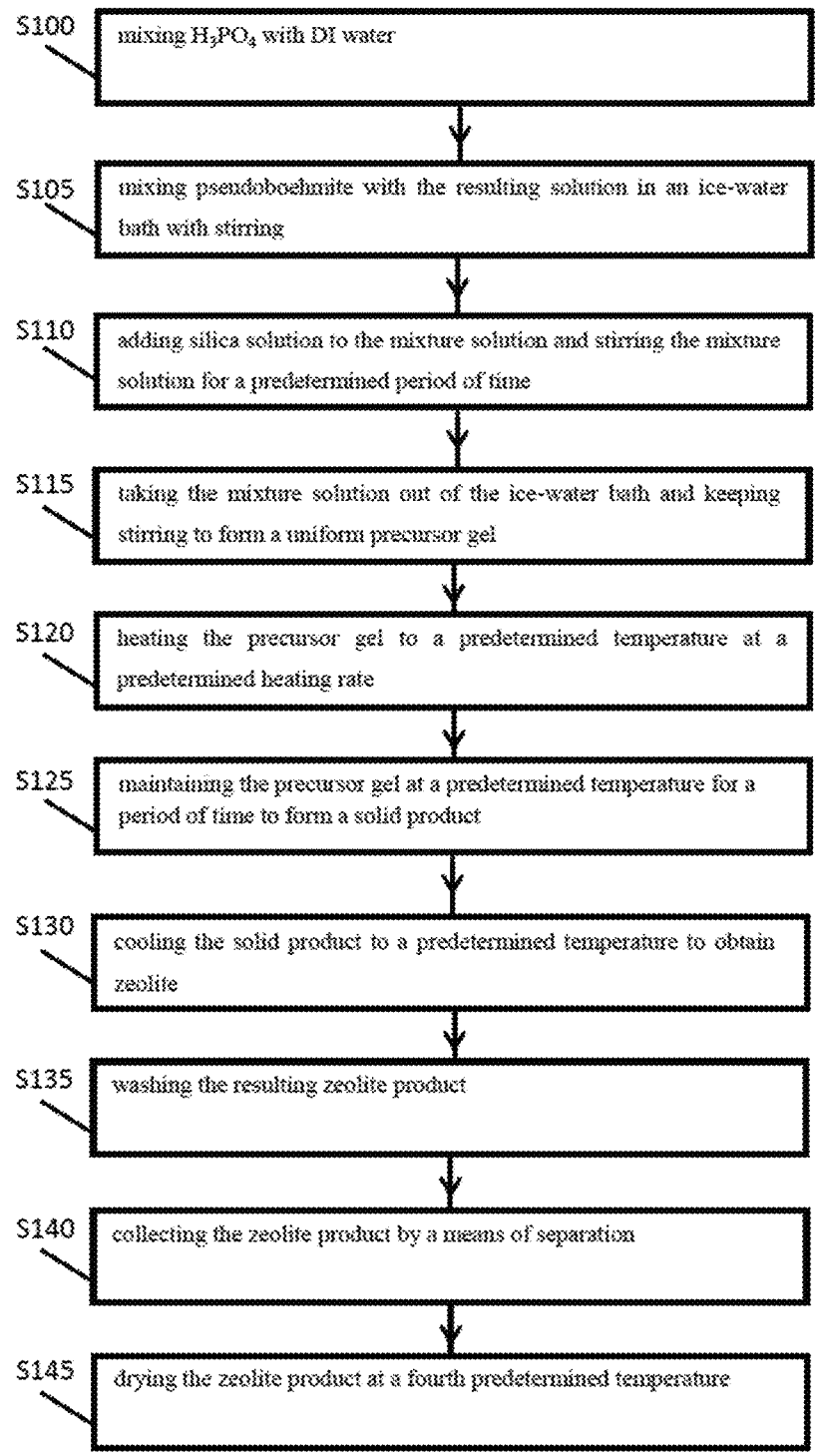
FIG. 1 is a flow diagram illustrating a process for synthesizing zeolite, according to an embodiment of the subject invention.

Embodiments of the subject invention pertain to a composite material of Angstrom-scale well-ordered nanowire arrays in zeolite and its fabrication methods. The Angstrom-scale nanowire arrays can be prepared by using zeolite as a template. The zeolite template can be prepared by a hydrothermal method to obtain porous structures with an average pore size of 0.74 nm to ensure the diameters of nanowire arrays thereafter prepared to be of an Angstrom scale.

The Angstrom-scale nanowire arrays can be made of a variety of materials including, hut are not limited to, aluminum (Al), gallium (Ga), zinc (Zn), carbon (C), indium (In), or magnesium (Mg). When the diameters of the nanowire arrays dispersed on the internal surfaces and external surfaces of the zeolite are of an Angstrom scale, the composite material of the nanowire arrays in zeolite can exhibit superior characteristics of one-dimensional (1D) superconductors.

A zeolite template such as SAPO-5 zeolite with an AFI topology, or other zeolites with one-dimensional channels, can be used as a template to fabricate the metal nanowires such as aluminum nanowires, gallium nanowires, indium nanowires, magnesium nanowires, or zinc nanowires, as well as carbon nanowires. Moreover, zeolite templates having a framework other than AFI topology, such as FAU, LTL, ABW, can also be used to fabricate nanowires of Angstrom scale or nanometer scale.

The following examples illustrate the subject innovation. Unless otherwise indicated in the following examples and elsewhere in the specification and claims, all parts and percentages are by weight, all temperatures are in degrees Centigrade, and pressure is at or near atmospheric pressure.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

Preparation and Characterization of Zeolite Templates

According to an embodiment of the subject invention, a zeolite template, for example, SAPO-5 zeolite with an AFI topology, can be synthesized by a hydrothermal method.

In one embodiment, the synthesis ingredients include aluminum oxide ($Al_2O_3$), phosphorus pentoxide ($P_2O_5$), silicon dioxide ($S_iO_2$), triethanolamine (TEA), and deionized (DI) water.

In one embodiment, a molar ratio of $Al_2O_3:P_2O_5:S_iO_2$: $TEA:H_2O$ can be 1:0.8:1:3.5:50.

According to one exemplary embodiment of the subject invention, the zeolite can be synthesized by the following steps:
(1) mixing phosphoric acid ($H_3PO_4$) with deionized (DI) water;
(2) mixing pseudoboehmite with the resulting solution in an ice-water bath with stirring adding silica solution to the mixture solution and stirring the mixture solution for a first predetermined period of time;
(3) taking the mixture solution out of the ice-water bath and keeping stirring for a second predetermined period of time at a first predetermined temperature to form a uniform precursor gel;
(4) heating the precursor gel to a second predetermined temperature at a first heating rate;
(5) maintaining the precursor gel at the second predetermined temperature for a third predetermined period of time to form a solid product;
(6) cooling the solid product to a third predetermined temperature to obtain the zeolite;
(7) washing the resulting zeolite;
(8) collecting the zeolite by a means of separation; and
(9) drying the zeolite at a fourth predetermined temperature.

FIG. 1 shows an exemplary process for synthesizing the zeolite crystals, according to an embodiment of the subject invention. Referring to FIG. 1, at step S100, about 5.68 g of phosphoric acid ($H_3PO_4$) (for example, $H_3PO_4$ of 85% from Panreac) is mixed with about 22.8 ml of deionized (DI) water to form a solution. Next, at step S105, the solution is placed in an ice-water bath and about 4.42 g of pseudoboehmite (for example, Catapal A from SASOL) is added to the solution to obtain a mixture, and the mixture is stirred for about one hour.

Then, at step S110, about 4.62 g of a silica solution (for example, Ludox HS-40 having 40 wt % from Sigma-Aldrich) is added to the mixture of the step of S105 and the mixture is stirred for about another 1 hour. Further, at step S115, the resulting solution of the step S110 is taken out of the ice-water bath and stirred for about 12 hours at room temperature to form a uniform precursor gel.

Next, at step S120, the precursor gel obtained from the step S115 is transferred to a container, for example a Teflon autoclave having a capacity of 100 ml, and the container is placed in an oven (for example, MARS-5 from CEM with maximum power of 1600 W). The precursor gel is rapidly heated to about 180° C. within about 1.5 minutes with a heating power of, for example, 1600 W. Then, at step S125; the precursor gel is maintained in the container at that temperature of about 180° C. for a duration of about 2.5 hours with a heating power of, for example, 400 W.

Further, at step S130, the precursor gel is cooled to room temperature to obtain the zeolite. Next, the zeolite is washed at step S135, is collected by a means of separation, for example, centrifugation at step S140; and is dried at about 120° C. at step S145.

In one embodiment, the resulting zeolite can have microplatelet shaped crystals having a hexagonal shape, with a thickness of about 2 microns and a lateral dimension in a range of 6-10 microns.

It is known that zeolites are aluminosilicate or aluminophosphate compounds having very regular molecular structures containing pores. In one embodiment, the framework of the zeolite synthesized as described above can comprise alternating tetrahedral $[(AlO\_4)]\^-$ and $[(PO\_4)]\^+$ that form linear channels. The axis in parallel to the linear channels is defined as c-axis and the plane perpendicular to c-axis is defined as ab plane.

In one embodiment, the linear channels of the zeolite can exhibit a triangular lattice structure in the ab plane with a center-to-center separation of about 1.37 nm between the nearest channels.

In one embodiment, the crystals of the zeolite synthesized can be electrically insulating and optically transparent from ultraviolet to the near infrared, and thermally stable up to 1200° C.

In one embodiment, the c-axis of the crystals can be perpendicular to the platelet surface.

Fabrication of Aluminum Nanowire Arrays in Zeolite

Figure 2:
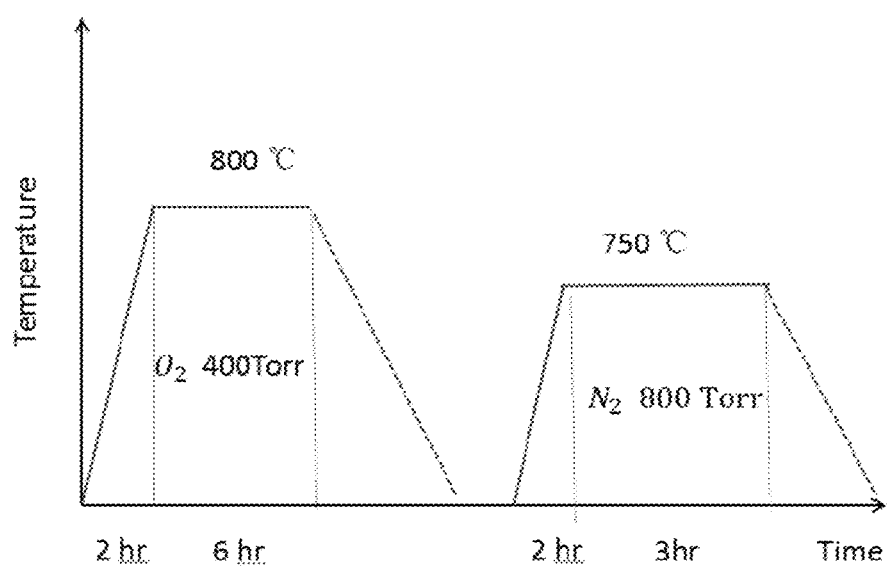
FIG. 2 is schematic illustration of a process for fabricating aluminum nanowires by using the zeolite synthesized as shown in FIG. 1 as a template, according to an embodiment of the subject invention.

Referring to FIG. 2, according to an embodiment of the subject invention, the crystals of the zeolite template synthesized as described above are heated at about 800° C. under a pressure of about 400 Torr in oxygen atmosphere for a duration of about 6 hours to remove the TEA precursors inside the zeolite template crystals.

Next, aluminum (Al) (for example, in a form of powder) is added to the zeolite template crystals with a weight ratio of zeolite template crystals:Al=1:9. The aluminum powder and the zeolite template crystals are uniformly mixed and pressed into a disk by using a box having four lateral sides fixed but with top side or bottom side movable, so as to facilitate applying pressure to the mixture.

As illustrated by FIG. 2, the resulting mixture is placed in a heating apparatus such as an oven and heated in a temperature range between about 660° C. and about 900° C., preferably at a temperature between about 750° C. and about 850° C., under a pressure in a range between about 100 Torr and about 1600 Torr, preferably at a pressure of about 800 Torr, in an inert gas (for example, argon or nitrogen) atmosphere for about 3 hours. The inert gas is used as protecting gas because aluminum can be easily oxidized.

It is known that the melting point of aluminum is at about 660° C. Thus, in the heating process described above, the aluminum powder melts and penetrates into linear channels of the zeolite template. In order to penetrate into the pores of zeolite, the melted liquid aluminum has to overcome the surface tension of the liquid aluminum. The surface tension of the liquid aluminum linearly decreases with increasing temperatures. Therefore, in one embodiment, the temperature of the oven is adjusted and a pressure in a range of 1 kPa to 100 kPa is applied to the oven to improve the pore filling factor of the resulting aluminum nanowire arrays in the zeolite.

Once the oven is cooled down, the liquid aluminum is solidified inside the linear channels of the zeolite template to form the composite material of aluminum nanowire arrays in zeolites.

In one embodiment, the preferred optimal condition of the aluminum penetrating process is 850° C. with a pressure of 800 Torr. As a result, diameters of the aluminum nanowires obtained by using the zeolite template are close to the pore size (for example, 0.74 nm) of the zeolite template crystals.

Figure 3:
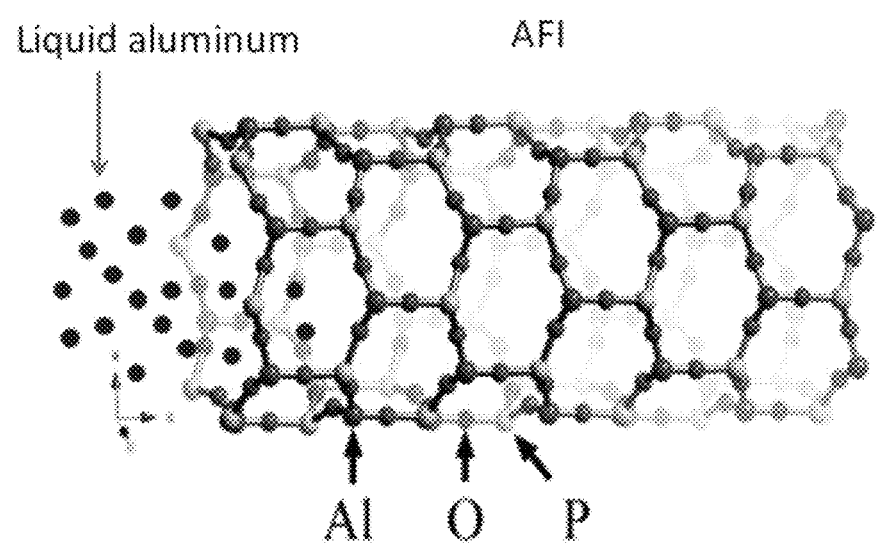
FIG. 3 is a schematic illustration of a process of liquid aluminum penetrating into linear pores of a zeolite template according to an embodiment of the subject invention.

FIG. 3 shows a process of the liquid aluminum penetrating into the linear pores of the zeolite template crystals and forming stable structure due to the attractive force between aluminum atoms and oxygen atoms on the channel walls of the zeolite template crystals, according to an embodiment of the subject invention.

In one embodiment, the zeolite template crystals synthesized have porous structures with an average pore size of about 0.74 nm. As a result, the plurality of nanowire arrays dispersed on internal or external surfaces of the porous structures can have an average diameter smaller than 1 nm.

Characterization of Aluminum Nanowire Arrays in Zeolite

The composite material of the aluminum nanowire arrays in zeolite fabricated as described above are characterized by different methods, such as scanning electron microscope (SEM), X-ray diffraction (XRD), Raman spectra, energy-dispersive spectroscopy (EDX) and conductivity measurement.

Figure 4:
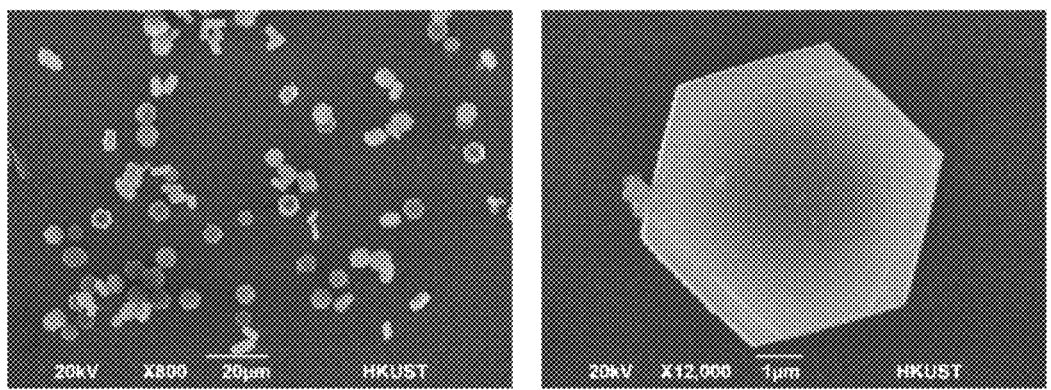
FIG. 4 shows Scanning Electron Microscope (SEM) images of aluminum nanowires in micro-platelet shaped zeolite template crystals according to an embodiment of the subject invention.

FIG. 4 shows Scanning Electron Microscope (SEM) images of aluminum nanowires embedded in micro-platelet shaped zeolite template crystals according to an embodiment of the subject invention.

Moreover, the optical and conducting properties of the Angstrom-scale aluminum nanowires in zeolite are characterized and the characterization results are described below with more details.

Figure 5:
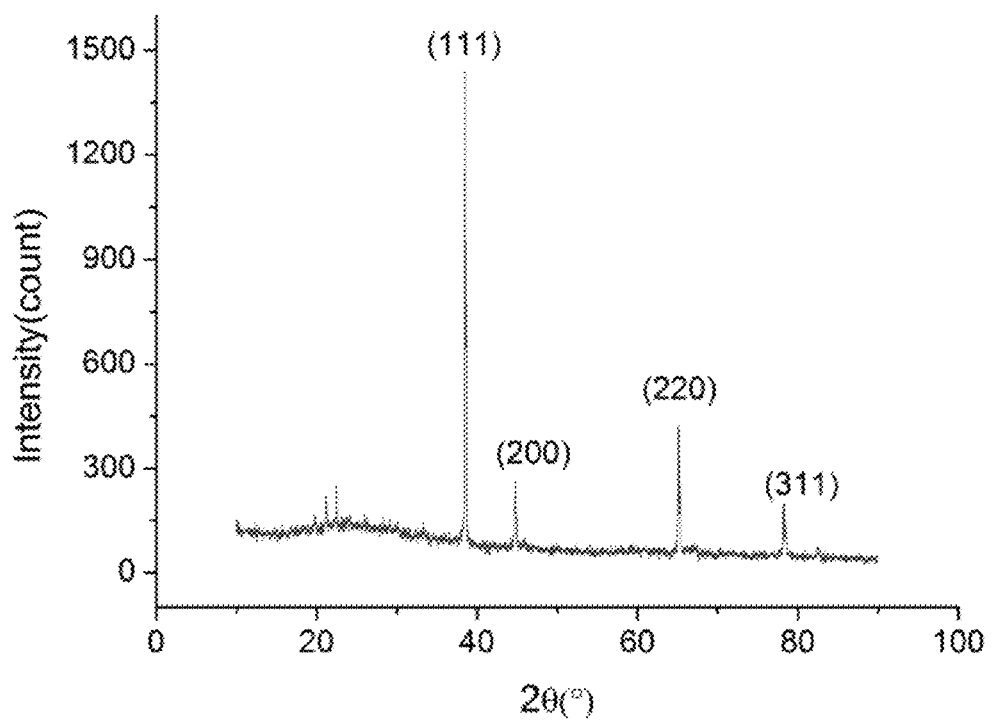
FIG. 5 shows X-ray Diffraction (XRD) spectra of aluminum nanowires in micro-platelet shaped zeolite template crystals with a wavelength of 1.540562 Å for Cu-Kα radiation according to an embodiment of the subject invention.

Referring to FIG. 5, the structure of the Angstrom-scale aluminum nanowires in zeolite is characterized by X-ray diffraction (XRD) with Cu-Kα radiation (for example, by Philips PW1830). The XRD pattern is recorded in a 2θ ranging of 10°-90 with a scan step of 0.03° at grazing incidence angle (for example 3°). The wavelength of Cu-Kα radiation can be 1.540562 Å. The first small peak is around 21° and the second small peak is around 22°, both resulting from the zeolite template. The other peaks that originated from the Angstrom-scale aluminum nanowires are labeled as (111), (200), (220), and (311) in FIG. 5. In particular, the Miller index of the third peak at 38.48° is labeled as (111), the fourth peak at 44.91° is labeled as (200), the fifth peak at 65.22° is labeled as (220), and the sixth peak at 78.30° is labeled as (311). It is noted that the intensity of the peak (111) is the strongest in FIG. 5.

Figure 6:
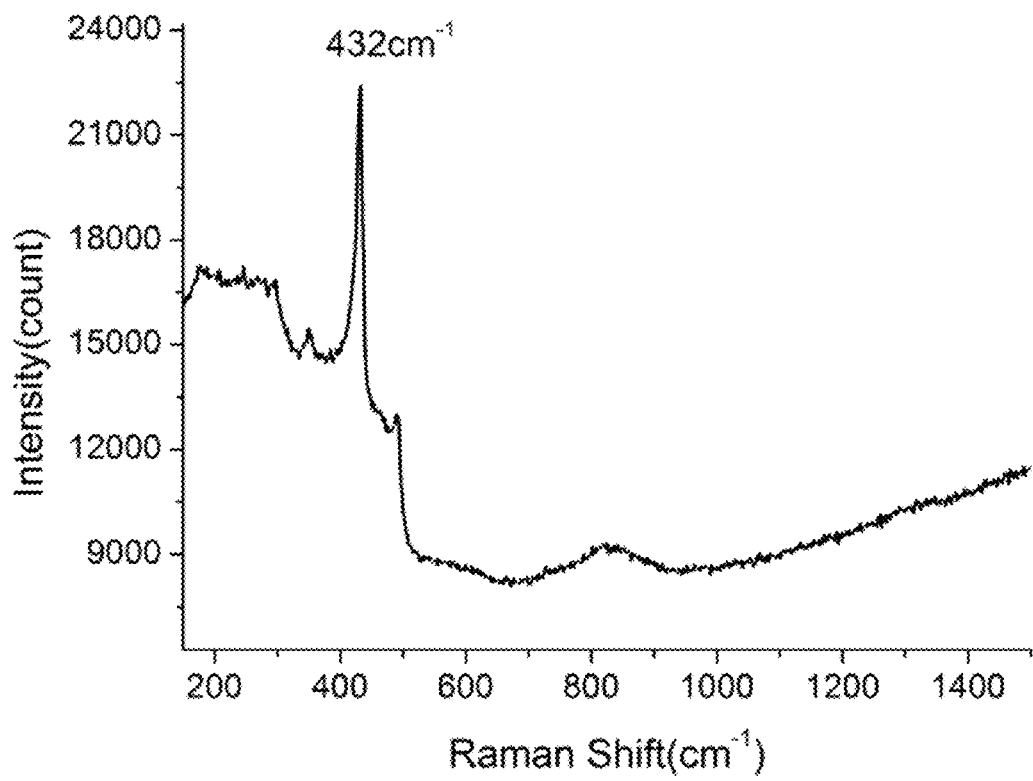
FIG. 6 shows Raman spectra of aluminum nanowires in micro-platelet shaped zeolite template crystals with excitation laser wavelength of 514.5 nm measured at room temperature, according to an embodiment of the subject invention.

Furthermore, FIG. 6 illustrates Raman spectroscopy of the Angstrom-scale aluminum nanowires in zeolite performed at room temperature by Micro-Raman (for example, a Renishaw InVia Confocal Raman microscope) with laser wavelength of 514.5 nm. For the example shown in FIG. 6, there is a very sharp peak at 432 $cm^{-1}$ as a result of the Al—O bond, indicating a layer of aluminum oxide is formed and disposed on the surface of the Angstrom-scale aluminum nanowires. Therefore, the aluminum nanowire arrays in zeolite can have a core-shell structure, where the core is the aluminum nanowire and the shell is the layer of aluminum oxide.

Next, the conducting property of the Angstrom-scale aluminum nanowire arrays in zeolite is measured. The sample preparation process for the measurement is described below. First, a thin layer of photoresist (for example, 950 PMMA 9 A) is coated on a surface of a glass film substrate. Then, crystals of the aluminum nanowire arrays in zeolite are dispersed on the photoresist and heated on a heating apparatus such as a hotplate at about 180° C. for about 90 seconds. Through this process, the crystals are fixed on the surface of the glass film substrate in order to facilitate the subsequent process. Next, a crystal standing on its side is selected. Then, a layer of titanium of a thickness (for example, 5 nm) is sputtered on the side surface of the micro-platelet sample crystal selected and another layer of gold of a thickness (for example, 60 nm) is sputtered above the titanium layer.

Figure 7:
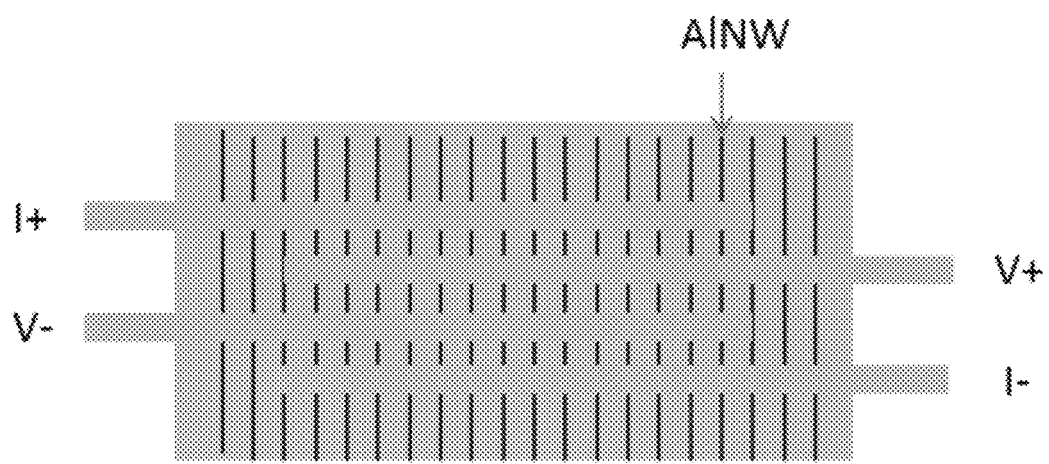
FIG. 7 is a schematic illustration of four-terminal geometry etched by the FIB of a platelet crystal of aluminum nanowires in a zeolite template standing on its side, wherein two electrodes outside are current leads while two electrodes inside are potential leads, according to an embodiment of the subject invention.

As illustrated in FIG. 7, a focused ion beam (FIB) is used to select one crystal of the aluminum nanowire arrays in zeolite. It is noted that the surface layer of the aluminum nanowire arrays in zeolite is etched by the FIB, since it is already oxidized by oxygen. Next, a layer of platinum (Pt) is sputtered on the etched area by the FIB as an electrode. Then, the FIB is used to make a four-terminal configuration as shown in FIG. 7. The interval between different electrodes is about 100 nm.

Figure 8:
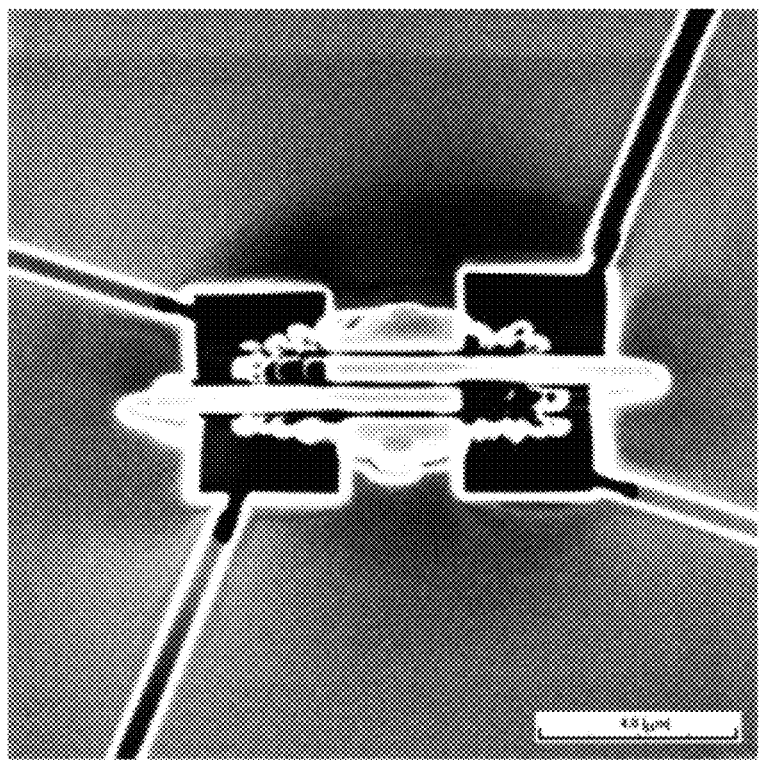
FIG. 8 shows an image of a four-terminal electrical measurement configuration taken by the FIB, wherein a constant current is supplied with the voltage probes measuring the voltage drop across a very narrow gap (for example, about 100 nm), according to an embodiment of the subject invention.

FIG. 8 is an image of the four-terminal electrical measurement configuration taken by the FIB. In electrical measurements, a constant current is supplied by voltage probes measuring the voltage drop across a very narrow gap (for example, about 100 nm), according to an embodiment of the subject invention.

Figure 9:
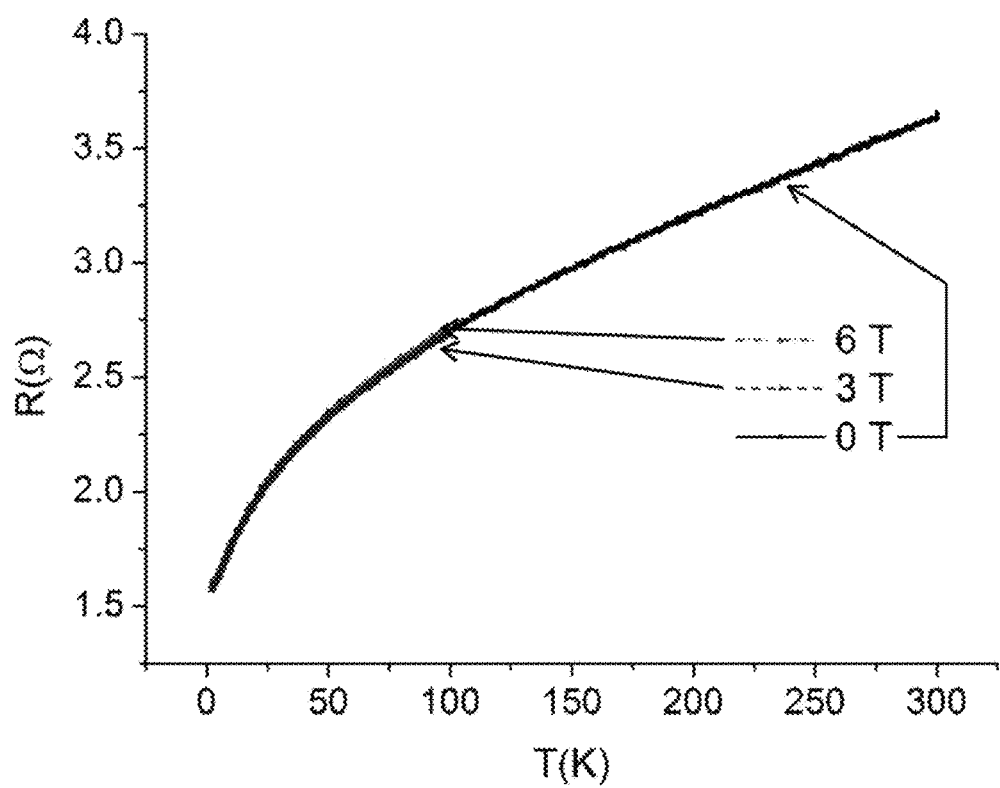
FIG. 9 illustrates resistance as a function of temperature for a first sample of the aluminum nanowires in micro-platelet shaped zeolite template crystals, measured in the four-terminal configuration, according to an embodiment of the subject invention.

Moreover, FIG. 9 illustrates temperature dependency of resistance for a first sample S1 of the Angstrom-scale aluminum nanowire arrays in zeolite measured in the four-terminal configuration with a current of 500 nA. As shown in FIG. 9, the resistance is linearly decreased from about 3.6Ω to about 2.7Ω, when the temperature is decreased from room temperature (about 300 K) to about 100 K. It is noted that the resistance is decreased at a faster rate when the temperature is decreased from about 100 K to about 50 K. Once the first sample S1 is cooled down to a temperature below 50 K, the resistance starts to drop smoothly but does not reach a resistance of zero when temperature is decreased to about 2 K, indicating a one-dimensional (1D) superconducting transition is achieved. It is also noted that the resistance of the Angstrom-scale aluminum nanowire arrays in zeolite has negligible changes, while the applied magnetic field is increased from 0 T to 3 T and then to 6 T. The results show that the critical field of the Angstrom-scale aluminum nanowire arrays is very high and the magnetoresistance behavior is consistent with one-dimensional superconductivity.

Another feature of superconductivity is nonlinear current-voltage characteristic observed below one-dimensional superconducting transition temperature.

Figure 10:
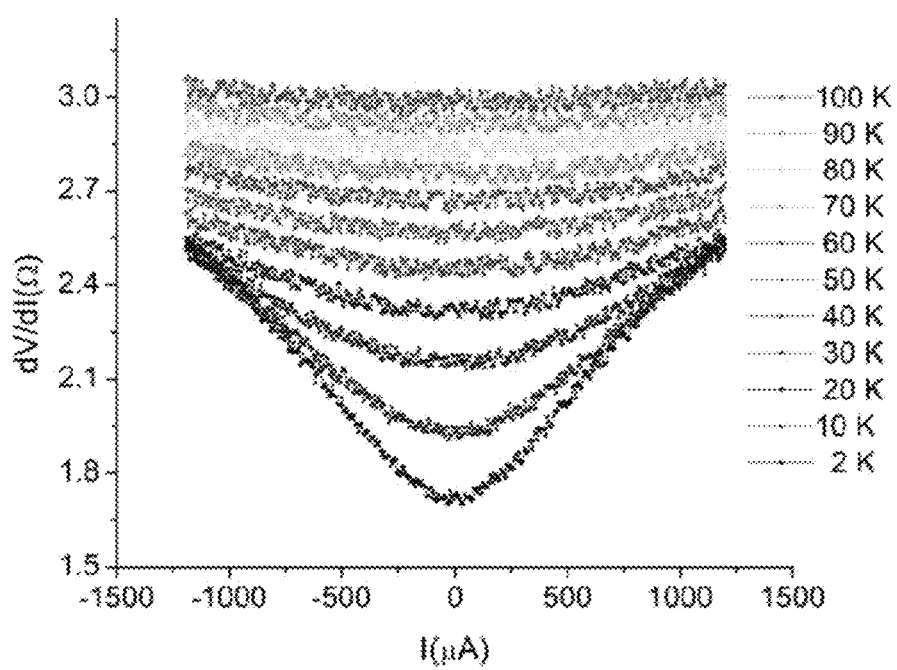
FIG. 10 illustrates differential resistance of a first sample of aluminum nanowires in micro-platelet shaped zeolite template crystals as a function of bias current at different temperatures according to an embodiment of the subject invention.

FIG. 10 illustrates current dependency of differential resistance at different temperatures. At a temperature of 2 K, the differential resistance is increased from 1.7Ω to 2.5Ω when the bias current is increased from 0 μA to 100 μA, indicating that the superconductivity of the Angstrom-scale aluminum nanowire arrays is suppressed by a large bias current. The drop in the differential resistance curve becomes more and more moderate when the temperature is increased from about 2 K to about 100 K; and the drop in the differential resistance curve is negligible after the temperature goes higher than 50 K. These results show that the transition temperature of the Angstrom-scale aluminum nanowire arrays is in a range of about 50 K to about 100 K. Thus, for the composite material of aluminum nanowire arrays in zeolite, the one-dimensional (1D) superconducting transition temperature can be significantly enhanced to about 50-100 K, from a transition temperature of the bulk aluminum which is about 1.2 K.

Figure 11A:
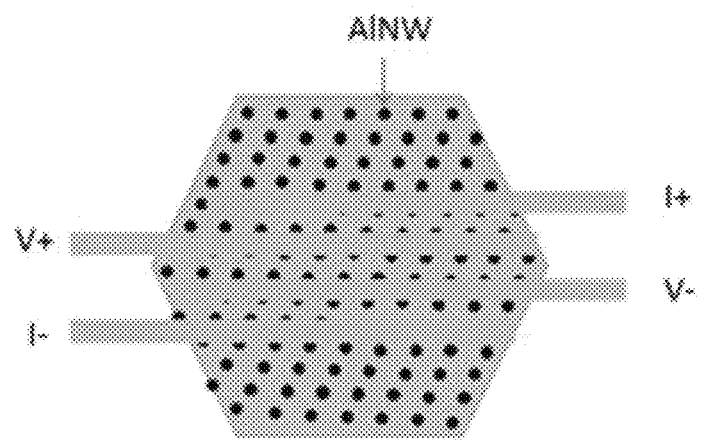
FIG. 11a is a schematic illustration of the four-terminal geometry on ab plane perpendicular to an axial direction of aluminum nanowires in micro-platelet shaped zeolite template crystals, according to an embodiment of the subject invention.

In one embodiment, another configuration is used to measure the conducting property of the Angstrom-scale aluminum nanowire arrays, where the electrodes are on the ab plane surface of the micro-platelet crystals of the zeolite template. The c-axis direction of the aluminum nanowires in zeolite is perpendicular to the electrodes. FIG. 11a illustrates the four-terminal geometry on ab plane perpendicular to an axial direction of the aluminum nanowires in micro-platelet shaped zeolite template crystals, according to an embodiment of the subject invention. In addition, FIG. 11b illustrates the four-terminal electrical measurement configuration on ab plane taken by the FIB according to an embodiment of the subject invention.

Figure 12:
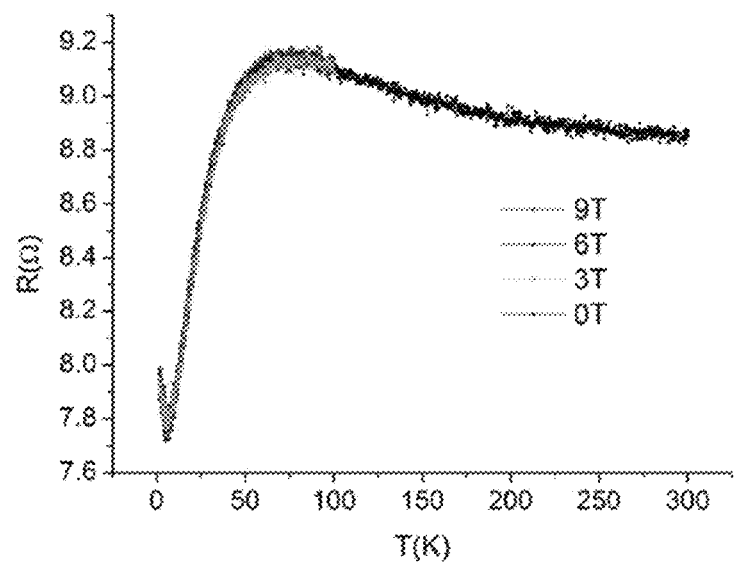
FIG. 12 illustrates temperature dependency of resistance for a second sample of the aluminum nanowires in micro-platelet shaped zeolite template crystals measured by the four-terminal configuration on ab plane, according to an embodiment of the subject invention.

Referring to FIG. 12, the temperature dependency of the resistance for a second sample S2 of the Angstrom-scale aluminum nanowire arrays in zeolite measured by the four-terminal geometry with a constant current of 500 nA is shown. It is noted that the resistance is increased slightly from about 8.8Ω to about 9.0Ω, when the temperature is decreased from about 300 K to about 50 K. Then, the resistance starts to decrease sharply but smoothly, when the temperature is decreased from about 50 K to about 2 K.

Figure 11B:
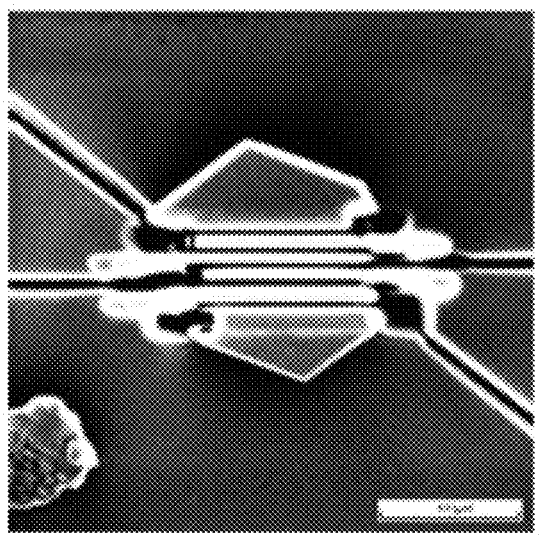
FIG. 11b is an image of the four-terminal electrical measurement configuration on ab plane taken by the FIB according to an embodiment of the subject invention.

For the examples shown in FIGS. 11a and 11b, the magnetoresistance of the Angstrom-scale aluminum nanowire arrays is also measured by the four-terminal configuration on ab plane.

Figure 13:
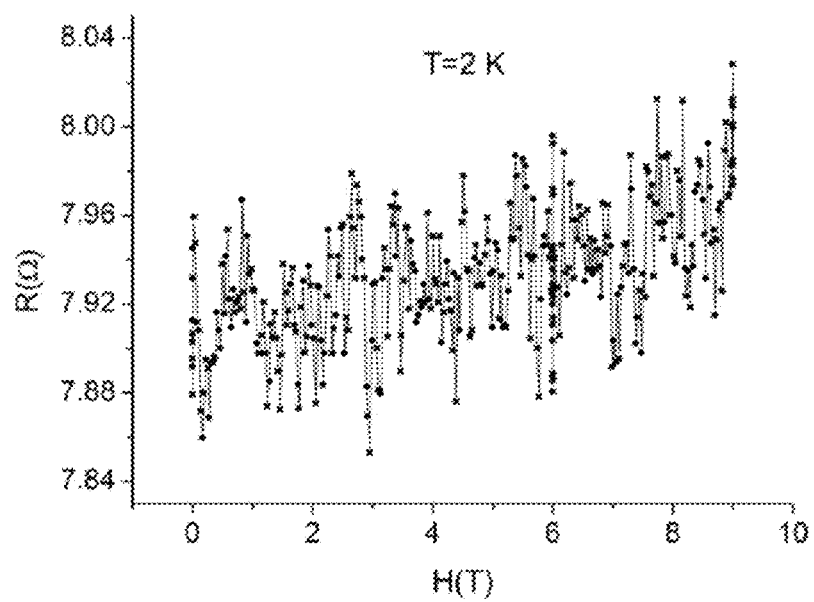
FIG. 13 illustrates magnetoresistance of the second sample of the aluminum nanowires in micro-platelet shaped zeolite template crystals measured by the four-terminal configuration on ab plane, wherein an applied magnetic field is in parallel to an axial direction of the aluminum nanowires in zeolite, according to an embodiment of the subject invention.

In one embodiment, when the applied magnetic field is increased from 0 T to 9 T, the resistance of the second sample S2 is increased smoothly but only slightly, as shown in FIG. 13.

Figure 14:
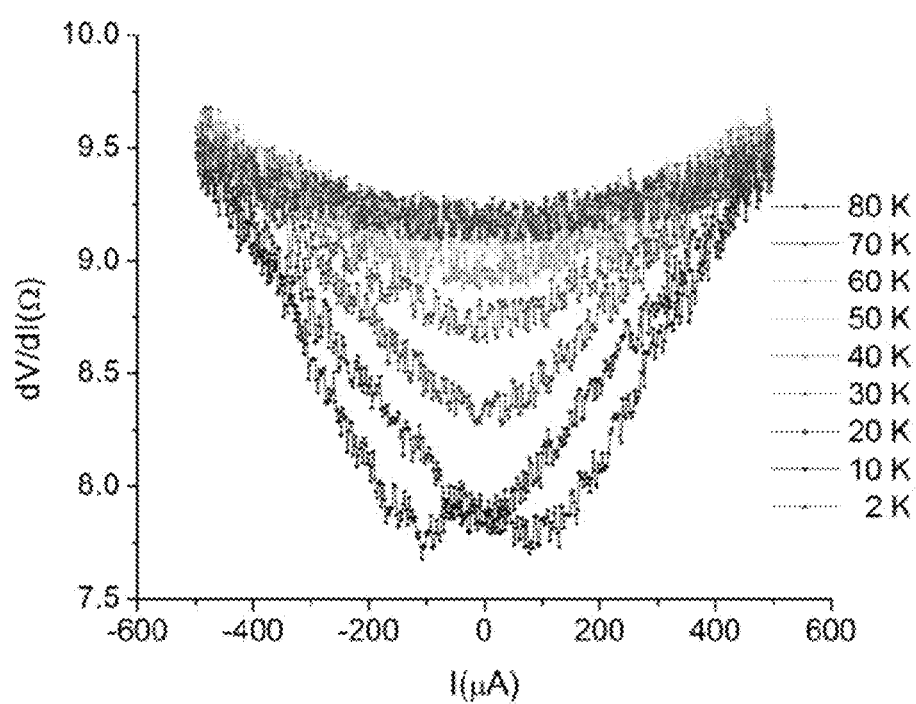
FIG. 14 illustrates differential resistance of the second sample of the aluminum nanowires in micro-platelet shaped zeolite template crystals as a function of bias current at different temperatures, according to an embodiment of the subject invention.

FIG. 14 illustrates the dependency between current and differential resistance for the second sample S2. At a temperature of about 10 K, there is a well-defined resistance drop at a bias current of zero, indicating superconductivity. This drop becomes more and more moderate when the temperature is increased from about 2 K to about 80 K and the drop in the differential resistance curve is negligible after the temperature goes higher than 50 K, indicating that the transition temperature of superconducting is around 50 K. These measurement results of differential resistance of the second sample S2 are consistent with the measurement results of the first sample S1.

In one embodiment, the Angstrom-scale aluminum nanowire arrays fabricated by using zeolite template can have a very high density, since the separation between adjacent aluminum nanowires can be as little as 1.4 nm.

Fabrication of Gallium Nanowire Arrays in Zeolite and Zinc Nanowire Arrays in Zeolite The micro-platelet zeolites with linear channels synthesized by the hydrothermal method as described above can be used as templates for fabrication of Angstrom-scale Gallium (Ga) nanowires and Angstrom-scale Zinc (Zn) nanowires.

In one embodiment, the ingredients used in the zeolite template synthesis can include, but not limited to, aluminum oxide, phosphorus pentoxide, silicon dioxide, triethanolamine (TEA), and deionized (DI) water.

For fabricating Gallium (Ga) nanowires in zeolite, liquid Ga can be mixed with the zeolite template synthesized and then heated in a sealed container at a temperature of about 80° C. under a pressure up to about 100 bar. Then, the mixture is rapidly cooled by liquid nitrogen, resulting in Angstrom-scale Gallium (Ga) nanowires in zeolite.

Similarly, for fabricating Zinc (Zn) nanowires in zeolite, liquid Zn can be mixed with the zeolite template synthesized and then heated in a sealed container at a temperature of about 500° C. under a pressure up to about 100 bar. Then, the mixture is rapidly cooled by liquid nitrogen to obtain the Zinc (Zn) nanowires in zeolite.

In one embodiment, the gallium (Ga) or zinc (Zn) nanowires fabricated can infiltrate into the one-dimensional (1D) linear channels of the zeolite template such as AlPO-5 (AFI) having an internal pore diameter of about 7 Å, and the gallium (Ga) or zinc (Zn) nanowires can be separated by an insulating wall of about 7-9 Å.

In one embodiment, the resulting Angstrom-scale Ga or Zn nanowire arrays in zeolite, arranged in Josephson-coupled triangular arrays with an ab-plane lattice constant of 14.4 Å, display superconductivity with Tc values of about 7.2 K and about 3.7 K, for Ga and Zn, respectively. The superconductivity with Tc values for the Angstrom-scale Ga or Zn nanowire arrays in zeolite are significantly enhanced by a factor of about 7 and about 4, in comparison to the superconductivity with Tc of bulk Ga or bulk Zn, respectively.

Since the zeolite template of the composite superconductor dictates the nanostructure of Ga and Zn to be one-dimensional (1D) in the electronic sense, a highly advantageous effect for the superconducting pairing is achieved. The arrangement in a densely packed array structure of the Angstrom-scale Ga or Zn nanowire in zeolite inhibits coherence being completely suppressed by strong phase fluctuations as in other conventional one-dimensional (1D) superconductors.

In one embodiment, Cooper pairs are confined in Ga or Zn nanowire arrays with thicknesses of only a few hundred picometers. The nanowire arrays of an Angstrom-scale almost approach the limit of a monoatomic chain and are in extremely close distance to each other. By being embedded in the linear pores of zeolite single crystals, the nanowire arrays of Angstrom-scale form a regular array of almost crystalline quality.

It is well-known that the bulk Ga or the bulk Zn is an elemental Bardeen-Cooper-Schrieffer (BCS) superconductor. Previously, only nanostructured Ga and Zn superconductors with sizes ranging from a few nanometers to several tens of nanometers have been investigated.

The superconducting properties of the Angstrom-scale Ga or Zn nanowire arrays in zeolite are characterized by DC magnetization and by specific heat measurements as discussed below.

Figure 15A:
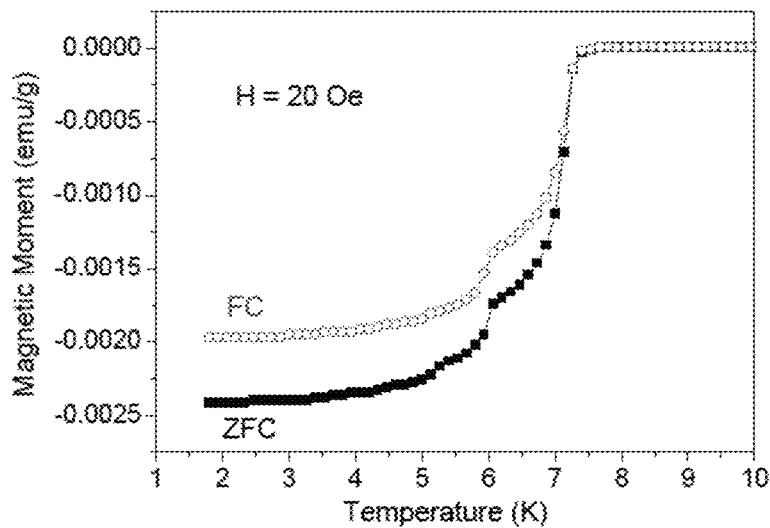
FIG. 15a illustrates DC magnetization of Ga nanowires in zeolite, wherein magnetic moment is shown as a function of temperature for an external magnetic field of 20 Oe under ZFC and FC conditions, according to an embodiment of the subject invention.

DC Magnetizations of Gallium Nanowire Arrays in Zeolite and Zinc Nanowire Arrays in Zeolite FIG. 15a shows the results of zero-field-cooled (ZFC) and field-cooled (FC) DC magnetizations of the Angstrom-scale Ga nanowire arrays in zeolite measured with a VSM SQUID magnetometer. In one embodiment, the demagnetization factor of the sample is measured to be about 0.55. A clear Meissner effect is observed with onset at 7.7 K in a magnetic field of 20 Oe. The superconducting transition is sharp and about 7 times as much as that of the bulk Ga (Tc=1.08 K for bulk Ga).

Ga nanowires, with one-dimensional nature of freestanding, are expected to have a rather gradual transition due to the phase slips. Therefore, the sharp transition of Ga nanowires observed in FIG. 15a is attributed to the Josephson coupling between the nanowires. The ZFC data reveals the flux expulsion and subsequent flux treading as the temperature rises. The FC data show only partial flux expulsion. The ZFC and FC data also indicate that macroscopic screening currents can be formed in Ga nanowire arrays embedded in the insulating zeolite crystals, requiring transverse tunneling current between the Ga nanowires due to the Josephson coupling.

Figure 15B:
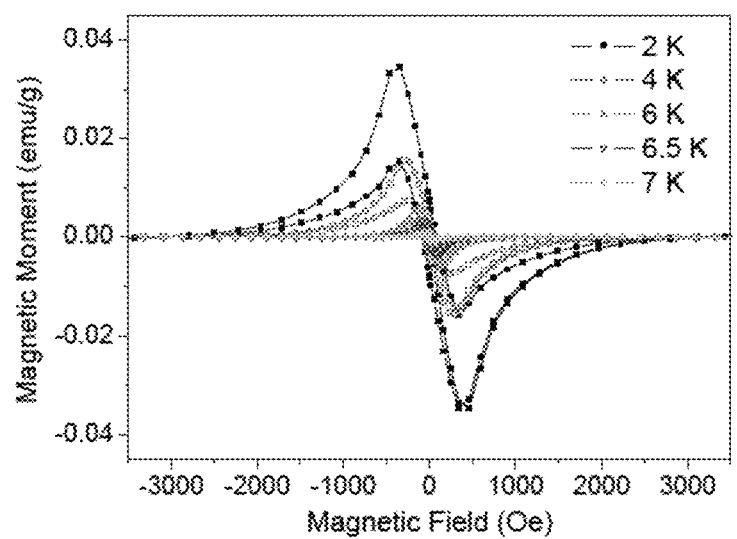
FIG. 15b illustrates DC magnetization of Ga nanowires in zeolite, wherein magnetization hysteresis loops are shown at different temperatures according to an embodiment of the subject invention.

Referring to FIG. 15b, the magnetization hysteresis loops at different temperatures are shown. It is well known that the bulk Ga is a type-I superconductor with a critical field H_c=58 Oe. However, the Ga nanowire arrays in zeolite show typical behaviors of a type-II superconductor.

As illustrated in FIG. 15b, the initial branch of the hysteresis loops first displays an almost linear behavior of the Meissner state before it passes through a minimum and then very slowly approaches the upper critical field (H_c2) at about 700 Oe at 1.8K. The critical field of the Ga nanowire arrays in zeolite is thus more than 100 times greater than that of the bulk Ga thanks to the effect of nanostructure, transforming the Ga nanowire arrays from a type-I superconductor to a type-II superconductor.

Figure 16A:
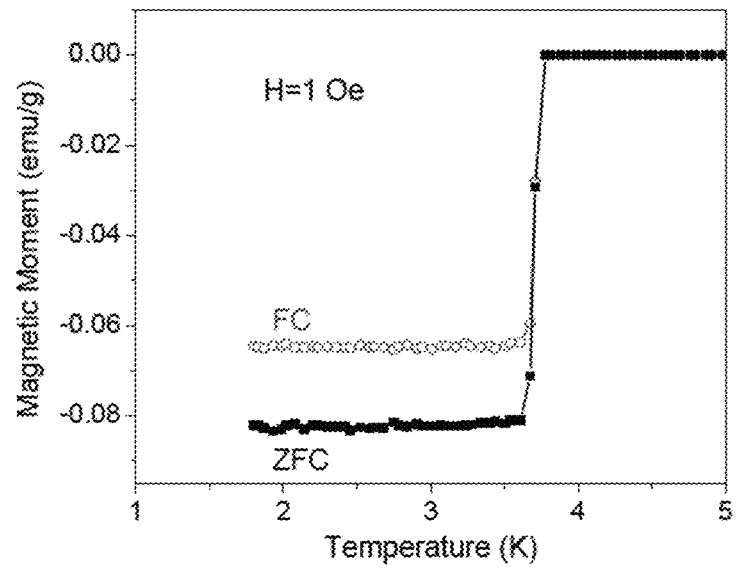
FIG. 16a illustrates DC magnetization of Zn nanowires in zeolite showing the ZFC and FC magnetic moment according to an embodiment of the subject invention.
Figure 16B:
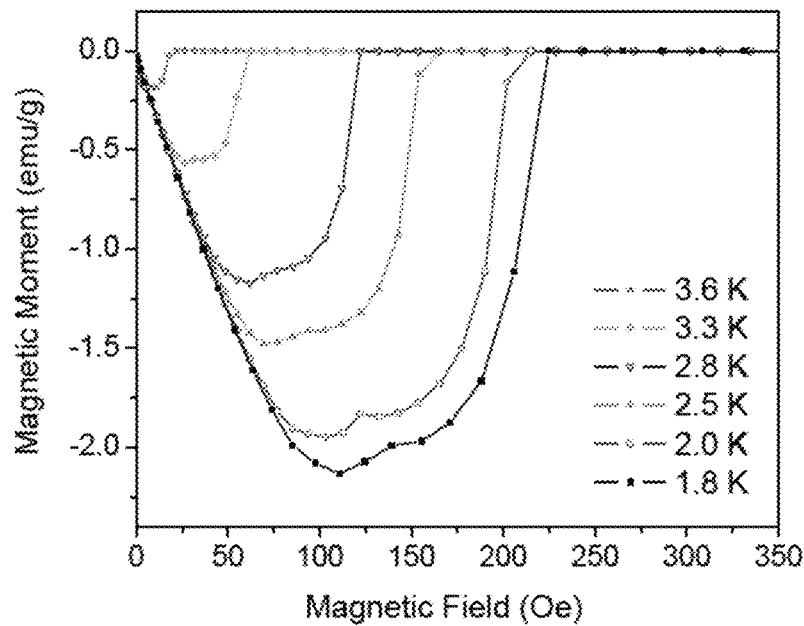
FIG. 16b illustrates DC magnetization of Zn nanowires in zeolite, wherein magnetization hysteresis loops are shown at different temperatures according to an embodiment of the subject invention.

In FIGS. 16a and 16b, the DC magnetization data of Zn nanowire arrays in zeolite are shown. In particular, referring to FIG. 16a, both the ZFC and FC curves show a sharp Meissner effect below 3.7 K. Due to the stronger Meissner signal for Zn nanowire arrays in zeolite, the measurement can be performed in an applied field of only 1 Oe, in contrast to the greater field of 20 Oe required for the corresponding measurement of Ga nanowire arrays in zeolite. Compared to the bulk Zn ($T_c$=0.85 K), the superconducting transition temperature of Zn nanowire arrays in zeolite is increased by a factor of about 4.

In addition, FIG. 16b illustrates the M versus H diagram for the Zn nanowires at different temperatures. The shapes of these hysteresis curves differ significantly from these of Ga nanowire arrays in zeolite and the transition at the critical field for Zn is much sharper than that of the Ga nanowires. The curves of the Ga nanowire arrays in zeolite clearly shows typical behaviors of a type-II superconductor, while the field dependent magnetization of Zn nanowire arrays in zeolite could on first view be interpreted as that of a superconductor at the borderline between a type-I superconductor and a type-II superconductor.

As illustrated below with the help of specific heat data, the Zn nanowire arrays in zeolite is determined to be a type-I superconductor. For a type-I superconductor with ideal demagnetization factor, one would expect that the Meissner screening would have vanished abruptly at the critical field thus forming saw-tooth like shapes of curves in the M versus H diagram. The fact that the critical field transition of the Zn nanowire arrays in zeolite appears quite broad instead is attributed to the non-ideal demagnetization factor of about 0.6 of the sample of the Zn nanowire arrays in zeolite, which causes the intermediate state (not the Abrikosov state of type-II superconductors) with partial field penetration to occur, rendering the critical field transition into a broad step. In one embodiment, at 1.8 K, the critical field of the Zn nanowire arrays in zeolite reaches 22 mT, which is about four times the value of the bulk Zn ($H_c$=5.8 mT).

Moreover, the specific heat of the Ga nanowire arrays in zeolite and of the Zn nanowire arrays in zeolite are measured with a calorimeter, respectively. The specific heat in the normal state is analyzed by the standard approach using following equation: $C_n(T\rightarrow 0)=\gamma_n T+\Sigma_{k=1}^3 \beta_{2k-1} T^{2k+1}$.

Here, the first term is the electronic contribution of the Ga nanowire arrays in zeolite or of the Zn nanowire arrays in zeolite with the Sommerfeld constant $\gamma_n$, as denoted by $C^{elect.}$ below; and the second term is the low-temperature expansion of the lattice specific heat according to the Debye model.

Figure 17A:
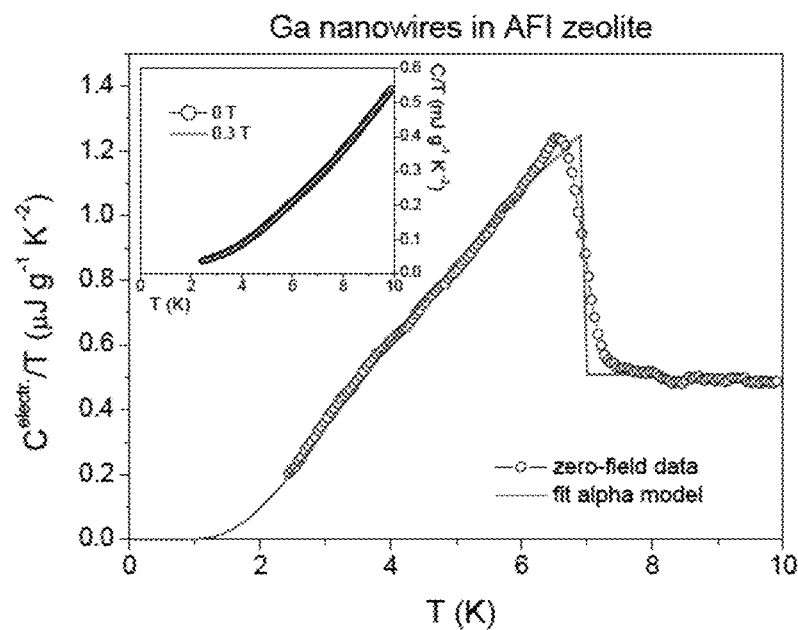
FIG. 17a illustrates the specific-heat data for Ga nanowires in zeolite and Zn nanowires in zeolite, showing the electronic specific heat of nanowires in zeolite together with a fit to the alpha model, wherein the insert shows the total specific heat in 0 and 0.3 T, which represents the superconducting and normal state, respectively, according to an embodiment of the subject invention.
Figure 17B:
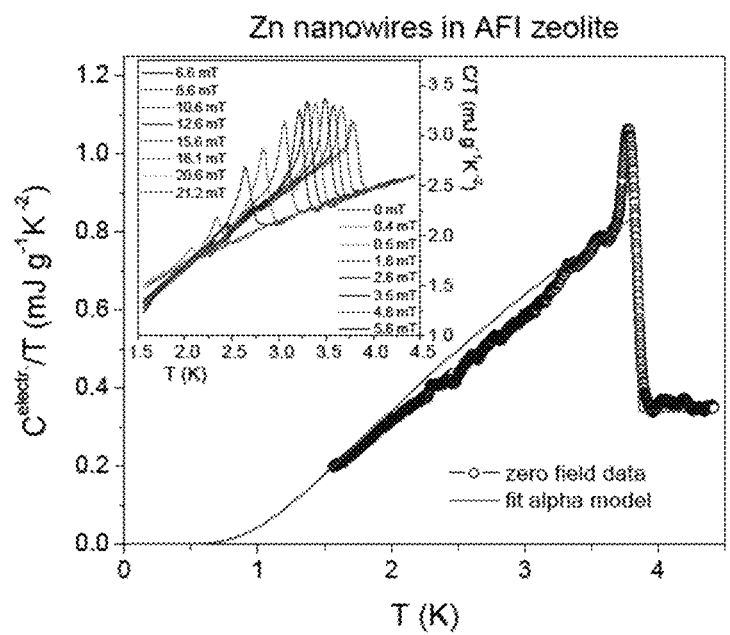
FIG. 17b illustrates the specific-heat data for Ga nanowires in zeolite and Zn nanowires in zeolite, showing the electronic specific heat of Zn nanowires in zeolite together with a fit to the alpha model, wherein the insert shows the total specific-heat in different applied magnetic fields, according to an embodiment of the subject invention.

The electronic contribution is obtained by using a magnetic field strong enough to suppress superconductivity in the Ga or Zn nanowires. The specific heat jump associated with the superconductivity will be denoted in the following by ΔC. In particular, FIG. 17a shows $C^{elect}/T$ of the Ga nanowire arrays in zeolite and FIG. 17b shows $C^{elect}/T$ of the Zn nanowire arrays in zeolite.

It is noted that the superconducting transition anomaly ΔC is surprisingly sharp for both samples considering the quasi-1D nature of these composites.

In one embodiment, for the Ga nanowire arrays in zeolite, the transition midpoint is at about 7 K, but with a fluctuation tail up to about 7.7 K.

In one embodiment, for the Zn nanowire arrays in zeolite, the midpoint occurs at about 3.86 K. These results are in good agreement with the results of the magnetization.

It is also noted that the superconducting contribution to the specific heat of the Ga nanowires is extremely low. ΔC represents only 0.3% of the total specific heat. Despite the enormous Tc enhancement, the Ga nanowires in zeolite therefore may not be suitable for applications due to the very low filling factor of the zeolite pores. Nevertheless, the superconducting transition is significantly sharp and the composite material can produce a significant Meissner effect.

However, the situation is completely different with the Zn nanowire arrays in zeolite. The superconducting transition anomaly ΔC of the Zn nanowire arrays in zeolite represents 23% of the total specific heat of the composite material and is therefore clearly visible in the graph of the total specific heat without the need to subtract background data. Such a large ratio between ΔC and the normal state background is only possible, if the Zn nanowire arrays in zeolite has an almost perfect pore filling factor and the nanowires form a homogeneous and highly dense arrays. The Josephson coupling between the nanowires is so strong that the Zn nanowire arrays in zeolite sample remains a type-I superconductor, as can be seen from the sharp peaks sitting on top of the specific heat jumps at Tc. This observation is typical for type-I superconductors, for which the superconducting transition becomes of a first-order nature in any finite magnetic field. Although the residual magnetic field in the superconducting magnet cryostat used is carefully compensated, the peak does not vanish when approaching zero field, which is most likely due to the Earth's magnetic field, which is almost perpendicular to the axis of the superconducting magnet which is located in Hong Kong, where the test was conducted and hence cannot be compensated.

Figure 18A:
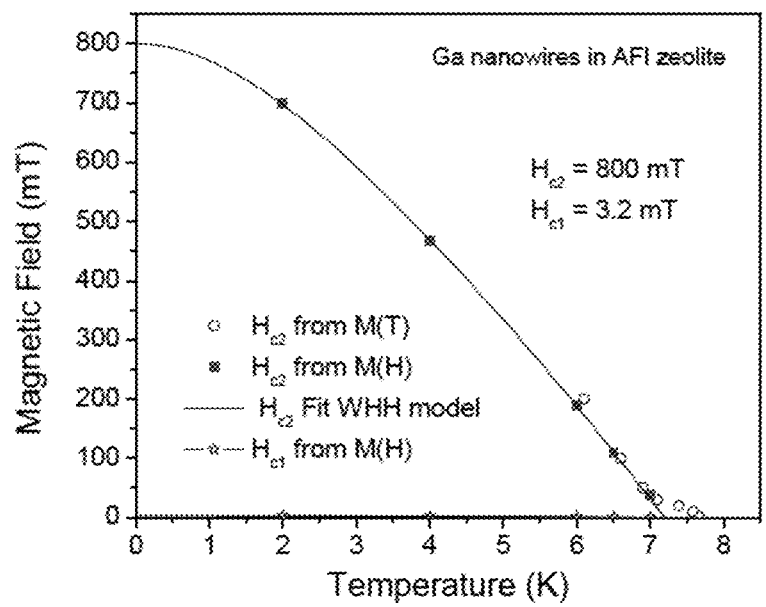
FIG. 18a illustrates superconducting phase diagrams of Ga nanowires in zeolite, wherein a fit with the standard Werthamer, Helfand and Hohenberg (WHH) model for the upper critical field of a type-II superconductor is added, according to an embodiment of the subject invention.
Figure 18B:
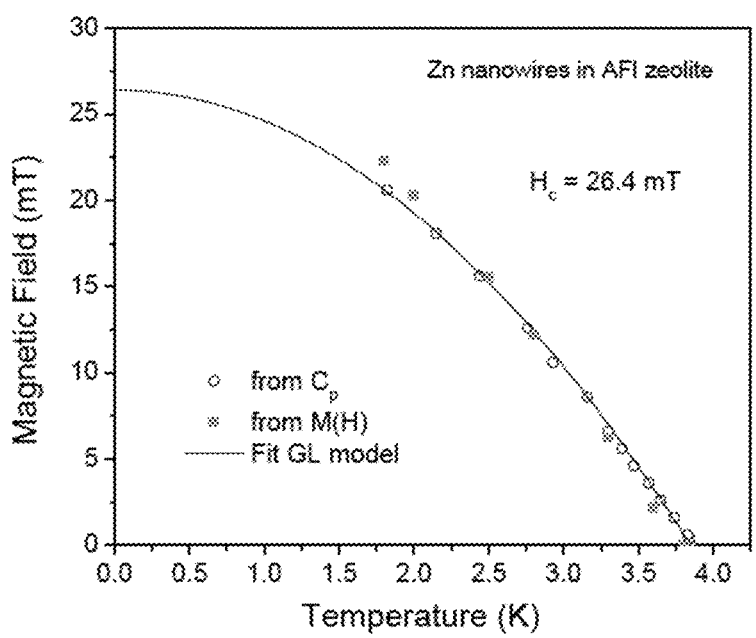
FIG. 18b illustrates superconducting phase diagrams of Zn nanowires in zeolite, wherein a fit with the standard Ginzburg-Landau model for the critical field of a type-I superconductor, according to an embodiment of the subject invention.

Superconducting Phase Diagrams of Gallium Nanowire Arrays in Zeolite and Zinc Nanowire Arrays in Zeolite The superconducting phase diagrams for the Ga nanowire arrays in zeolite and the Zn nanowire arrays in zeolite are shown in FIGS. 18a and 18b, respectively. The diagrams are derived from the magnetization data. For the Zn nanowire arrays in zeolite, the diagrams are also derived from the specific heat.

The temperature dependence of the upper critical field $H_{c2}(T)$ is derived from the onset of the Meissner signal in the M(T) and M(H) data, while the midpoint of the jumps is used in the specific heat at T.

Referring to FIG. 18a, the diagram of the Ga nanowire arrays in zeolite shows the characteristic magnetization hysteresis loops of a type-II superconductor. The standard Werthamer, Helfand and Hohenberg (WHH) model is used to extrapolate the upper critical field to the temperature zero K to obtain $H_{c2}(0)$=800 mT. The model fits well with the data, except at high temperatures, where the data deviate towards higher temperatures. According to the results of the specific heat tests, this is attributed to the fluctuation tail above the superconducting main transition at 7 K. The lower critical field $H_{c1}$ is normally obtained from the first deviation point from a linear behavior of the initial branch of the M(H)

hysteresis loops. This happens with very low magnetic fields of about 3 mT at 2 K and the expression $H_c(T)/H_{c0}=1-(T/T_c)^2$ from the Ginzburg-Landau theory is used to extrapolate the data to the temperature of zero K to obtain $H_{c1}(0)=3.2$ mT. It is noted that the latter $H_{c1}(0)$ determination may not be very accurate and can only provide a rough estimate.

Referring to FIG. 18(b), the Zn nanowire arrays in zeolite can be identified as a type-I superconductor based on the specific heat data. The temperature dependence of the critical field is determined as the upper onset of a Meissner effect in the M(H) data, and from the $T_c(H)$ value in the specific heat, which is determined from the centers of the specific heat jumps that occur just above the peaks. The expression $H(T)/H_{c0}=1-(T/T_c)^2$ based on the Ginzburg-Landau theory fits sufficiently well and is used to determine that $H_c(0)=26.4$ mT.

Fabrication of Metallic Carbon Nanowire Arrays in Zeolite

In one embodiment, Angstrom-scale carbon nanowires can be fabricated by a chemical vapour deposition (CVD) method by using the zeolite templates synthesized by the hydrothermal method as described above.

In one embodiment, the zeolite templates are heated in 6 atmospheres of methane ($CH_4$), which is used as carbon source, at a temperature of about 1000° C. for about 10 hours. In the heating process, the methane gas diffuses into the pores of the zeolite template and is decomposed due to the catalytic effect of the zeolite. As a result, the Angstrom-scale carbon nanowires are formed in the pores of the zeolite template.

Characterization of Metallic Carbon Nanowire Arrays in Zeolite

The optical and conducting properties of the Angstrom-scale carbon nanowires in zeolite are measured. The D band in the Raman spectra is obvious and the conductivity data show metallic behaviors of the Angstrom-scale carbon nanowires in zeolite in a temperature range from about 2 K to about 300 K. It is evident that the properties of the Angstrom-scale carbon nanowires in zeolite are quite different from these of the bulk carbon such as graphite.

Figure 19:
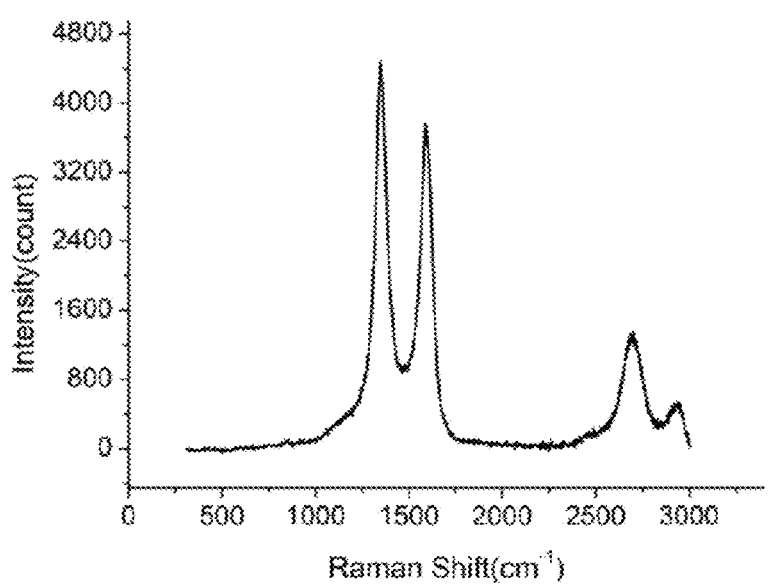
FIG. 19 shows Raman spectra of carbon nanowires in zeolite, according to an embodiment of the subject invention.

As illustrated in FIG. 19, the Raman spectra are measured by a micro-Raman system (for example, JobinYvon T64000) with a laser wavelength of 514.5 nm. It is noted that the zeolite template does not influence the Raman spectrum measurement of the Angstrom-scale carbon nanowires in zeolite, because the Raman signals of an empty zeolite template (control group) are much weaker than the Raman signals of the Angstrom-scale carbon nanowires in zeolite. Therefore, the Raman spectra of the Angstrom-scale carbon nanowires in zeolite can be measured. The peak around 1600 $cm^{-1}$ is the G band. The G band arises from the vibrations of carbon atoms in a hexagonal structure which are connected by C—C $sp^2$ bonds. The very high peak around 1350 $cm^{-1}$ is the D band which likely arises from the defects in the structure of the Angstrom-scale carbon nanowires in zeolite. The very high D band peak suggests that the structure of the Angstrom-scale carbon nanowires in zeolite is similar to that of graphene nanoribbon. The peak around 2700 $cm^{-1}$ is denoted as G' band which originates from a second-order process.

Figure 20:
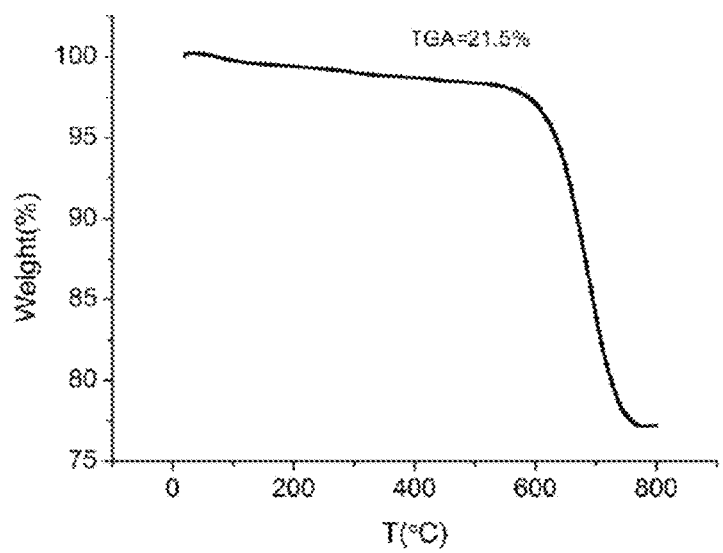
FIG. 20 shows weight percentage as a function of temperatures of thermogravimetric analysis (TGA) of carbon nanowires in zeolite according to an embodiment of the subject invention.

For the example shown in FIG. 20, thermogravimetric analysis (TGA) is used to assess the carbon content of the Angstrom-scale carbon nanowires in zeolite samples. In the measurements, samples of the Angstrom-scale carbon nanowires in zeolite are heated up in air from room temperature to about 800° C. with a heating rate of about 2° C./minute by a TGA device (for example, Q5000 TGA). The sample weight is constantly monitored by a microbalance. By burning off the carbon inside the zeolite crystals, the carbon contents from the difference in weight before and after the heating process are obtained. The carbon content of the Angstrom-scale carbon nanowires in zeolite is measured to be about 21.5 wt %. In FIG. 20, the derivative of the weight curve has a very sharp peak around 600° C., indicating that the decomposition temperature of the carbon nanowires structure inside the pores of the zeolite is around 600° C.

The electrical conducting properties of the Angstrom-scale carbon nanowires are studied by fabricating devices from the CVD-heated samples of the Angstrom-scale carbon nanowires. The focused ion beam (FIB) is used to make the four-terminal configuration. Measurement of the fabricated device is carried out by a Physical Property Measurement System (PPMS). A Keithley 6221 is used as the current source and a SR850 lock-in is used as voltmeter to measure the resistance of the Angstrom-scale carbon nanowires.

At room temperature, the resistivity of the Angstrom-scale carbon nanowires is measured to be 83.2 $\mu\Omega\cdot m$. Then, the resistivity of the Angstrom-scale carbon nanowires is compared with that of graphite. When the current is in parallel to a c-axis of the graphite, the resistivity is measured to be 2.5~5.0 $\mu\Omega\cdot m$. When the current is perpendicular to the c-axis, the resistivity is measured to be 3000 $\mu\Omega\cdot m$. Therefore, the resistivity of the Angstrom-scale carbon nanowires is between the resistivity of the parallel current and resistivity of the perpendicular current of the graphite.

Figure 21:
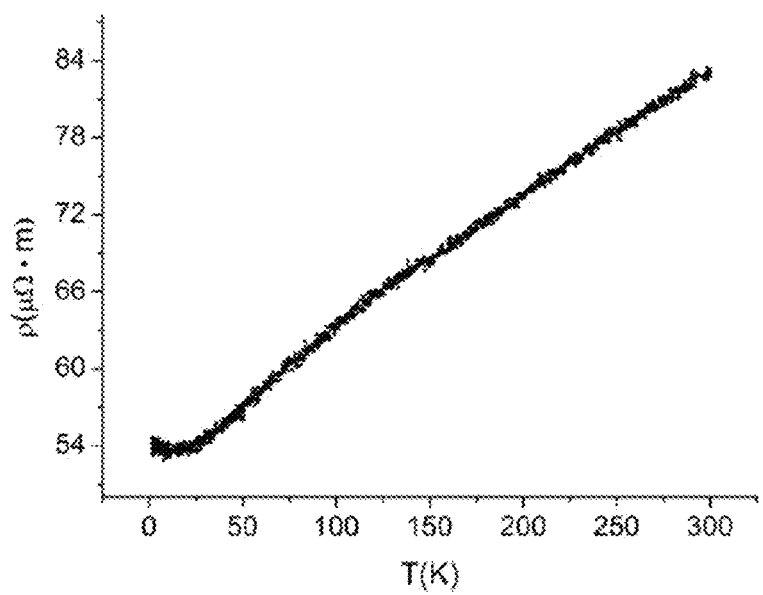
FIG. 21 shows electrical conducting properties of carbon nanowires in zeolite according to an embodiment of the subject invention.

As shown in FIG. 21, the resistivity of the Angstrom-scale carbon nanowires decreases linearly with temperature decrease, showing a metallic behavior. It is known that graphite is semiconducting at low temperatures and its resistivity increases with temperature decrease. Hence, the metallic behavior of the Angstrom-scale carbon nanowires at low temperatures is unexpected. Due to its superior conductivity, the Angstrom-scale carbon nanowires can be used as a material for electrodes of batteries.

The subject invention includes, but is not limited to, the following exemplified embodiments.

Embodiment 1

A method for fabricating Angstrom-scale aluminum nanowire arrays by using zeolite crystals as templates, comprising steps of:
  mixing aluminum and zeolite crystals with a predetermined weight ratio;
  heating the mixture under a first predetermined condition(s);
  cooling down the mixture;
  heating the mixture under a second predetermined condition(s); and
  cooling down the mixture to obtain Angstrom-scale aluminum nanowire arrays.

Embodiment 2

The method according to embodiment 1, wherein the predetermined weight ratio of zeolite crystals and aluminum is about 1:9.

Embodiment 3

The method according to any of embodiments 1-2, wherein the heating the mixture under a first predetermined condition(s) comprises heating the mixture at a temperature of about 800° C. under a pressure of about 400 Torr for about 6 hours in an oxygen atmosphere.

Embodiment 4

The method according to any of embodiments 1-3, wherein the heating the mixture under a second predetermined condition(s) comprises heating the mixture at a temperature in a range between about 660° C. and about 900° C. under a pressure in a range between 100 Torr and about 1600 Torr for about 3 hours in an inert gas atmosphere.

Embodiment 5

The method according to embodiment 4, wherein the temperature is in a range between about 750° C. and about 850° C.

Embodiment 6

The method according to embodiment 4, wherein the pressure is about 800 Torr.

Embodiment 7

The method according to any of embodiments 1-6, wherein the Angstrom-scale aluminum nanowire arrays obtained has an average diameter smaller than 1 nm.

Embodiment 8

A method for preparing Angstrom-scale metal nanowire arrays by using zeolite crystals as templates, comprising steps of:
  mixing liquid metal and zeolite crystals;
  heating the mixture under a first predetermined condition(s); and
  cooling down the mixture to obtain Angstrom-scale metal nanowire arrays.

Embodiment 9

The method according to embodiment 8, wherein the liquid metal is gallium (Ga) and the mixture is heated at a temperature of about 80° C. under a pressure smaller than 100 bar.

Embodiment 10

The method according to embodiment 8, wherein the liquid metal is zinc (Zn) and the mixture is heated at a temperature of about 500° C. under a pressure smaller than 100 bar.

Embodiment 11

The method according to any of embodiments 8-10, wherein the cooling down the mixture comprises cooling down the mixture by liquid nitrogen.

Embodiment 12

The method according to any of embodiments 8-11, wherein the Angstrom-scale metal nanowire arrays obtained has an average diameter smaller than 1 nm.

Embodiment 13

A method for preparing Angstrom-scale carbon nanowire arrays by using zeolite crystals as templates, comprising steps of:
  mixing methane ($CH_4$) and zeolite crystals;
  heating the mixture under a first predetermined condition(s); and
  cooling down the mixture to obtain Angstrom-scale carbon nanowire arrays.

Embodiment 14

The method according to embodiment 13, wherein the heating the mixture under a first predetermined condition(s) comprises heating the mixture at a temperature of about 1000° C. under a pressure of about 6 atmospheres for about 10 hours.

Embodiment 15

The method according to any of embodiments 13-14, wherein the Angstrom-scale metal nanowire arrays obtained has an average diameter smaller than 1 nm.

Embodiment 16

A method for preparing zeolite, comprising steps of:
  mixing pseudoboehmite with a phosphoric acid ($H_3PO_4$) solution in an ice-water bath with stirring;
  adding a silica solution to the mixture solution;
  taking the resulting solution out of the ice-water bath;
  keeping stirring the resulting solution at room temperature for a predetermined time period to form a precursor gel;
  heating the precursor gel to form a solid product; and
  cooling the solid product to obtain the zeolite crystals.

Embodiment 17

The method according to embodiment 16, wherein the heating the precursor gel to form a solid product comprises:
  heating the precursor gel to a temperature at a temperature of about 180° C. within about 1.5 minutes; and
  maintaining at the temperature for about 2.5 hours.

Embodiment 18

A composite material of Angstrom-scale nanowires in zeolite, comprising:
  zeolite having porous structures; and
  a plurality of nanowires having an average diameter smaller than 1 nm and dispersed on internal or external surfaces of the porous structures.

Embodiment 19

The composite material according to embodiment 18, wherein the plurality of nanowires is made of any one of aluminum (Al), gallium (Ga), zinc (Zn), and carbon (C).

Embodiment 20

The composite material according to any of embodiments 18-19, wherein the porous structures have an average pore size of 0.74 nm.

Embodiment 21

The composite material according to any of embodiments 18-20, wherein the plurality of nanowires is made of aluminum (Al) and comprises a layer of aluminum oxide on surfaces of the nanowires.

Embodiment 22

The composite material according to embodiments 21, wherein the nanowire arrays have a core-shell structure having the aluminum nanowire as a core and the aluminum oxide layer as a shell.

Embodiment 23

The composite material according to any of embodiments of 21-22, wherein at least one of nanowire arrays has one-dimensional (1D) superconducting transition temperature in a range between about 50 K to 100 K.

Embodiment 24

The composite material according to any of embodiments 21-23, wherein a distance between adjacent aluminum nanowires is about 1.4 nm.

Embodiment 25

The composite material according to embodiment 18, wherein the plurality of nanowires is made of any of the gallium (Ga) or zinc (Zn), and wherein the zeolite has an internal pore diameter of about 7 Å.

Embodiment 26

The composite material according to embodiment 25, wherein the gallium (Ga) or zinc (Zn) nanowires are separated by an insulating wall of about 7-9 Å.

Embodiment 27

The composite material according to embodiment 25, wherein the Ga or Zn nanowire arrays in zeolite are arranged in Josephson-coupled triangular arrays with an ab-plane lattice constant of 14.4 Å.

Embodiment 28

The composite material according to embodiment 25, wherein the Ga or Zn nanowire arrays in zeolite has superconductivity with $T_c$ values of about 7.2 K and about 3.7 K, for Ga and Zn, respectively.

Embodiment 29

The composite material according to embodiment 25, wherein the Ga nanowire arrays in zeolite has a demagnetization factor of about 0.55.

Embodiment 30

The composite material according to embodiment 25, wherein the Ga nanowire arrays in zeolite is a type-II superconductor.

Embodiment 31

The composite material according to embodiment 25, wherein the Zn nanowire arrays in zeolite is a type-I superconductor.

Embodiment 32

The composite material according to embodiment 25, wherein the Zn nanowire arrays in zeolite has a critical field of about 22 mT.

Embodiment 33

The composite material according to embodiment 19, wherein the plurality of nanowires is made of carbon and the nanowires in zeolite comprises a carbon content of about 21.5 wt %.

Embodiment 34

The composite material according to embodiment 19, wherein the plurality of nanowires is made of carbon and has a carbon nanowires decomposition temperature of around 600° C.

Embodiment 35

The composite material according to embodiment 19, wherein the plurality of nanowires is made of carbon and has metallic behaviors in term of resistivity.

Embodiment 36

The composite material according to embodiment 19, wherein the plurality of nanowires is made of carbon and has metallic behaviors in term of resistivity.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification.

REFERENCES

[1] P. Banerjee, I. Perez, L. Henn-Lecordier, S. B. Lee, and G. W. Rubloff, Nature Nanotechnology 4, 292 (2009).
[2] J. Benson, S. Boukhalfa, A. Magasinski, A. Kvit, and G. Yushin, ACS Nano 6, 118 (2012).
[3] B. Rizal, M. M. Archibald, T. Connolly, S. Shepard, M. J. Burns, T. C. Chiles, and M. J. Naughton, Analytical Chemistry 85, 10040 (2013).
[4] R. Yu, K. L. Ching, Q. Lin, S. F. Leung, D. Arcrossito, and Z. Fan, ACS Nano 5, 9291 (2011).
[5] T. H. Kim, X. G. Zhang, D. M. Nicholson, B. M. Evans, N. S. Kulkarni, B. Radhakrishnan, E. A. Kenik, and A. P. Li, Nano Letters 10, 3096 (2010).
[6] W. Li, C. Li, H. Ma, and J. Chen, Journal of the American Chemical Society 129, 6710 (2007).

[7] N. A. Melosh, A. Boukai, F. Diana, B. Gerardot, A. Badolato, P. M. Petroff, and J. R. Heath, Science 300, 112 (2003).

[8] J. J. Wang, L. Chen, X. Liu, P. Sciortino, F. Liu, F. Walters, and X. Deng, Applied Physics Letters 89, 141105 (2006).

[9] C. Ma, Y. Berta, and Z. Wang, Solid State Communications 129, 681 (2004).

[10] J. W. Lee, M. G. Kang, B. S. Kim, B. H. Hong, D. Whang, and S. W. Hwang, Scripta Materialia 63, 1009 (2010).

[11] S. T. Wilson, B. M. Lok, C. A. Messina, T. R. Cannan, and E. M. Flanigen, Journal of the American Chemical Society 104, 1146 (1982).

[12] C. J. Jacobsen, C. Madsen, J. Houzvicka, I. Schmidt, and A. Carlsson, Journal of the American Chemical Society 122, 7116 (2000).

[13] A. J. Yin, J. Li, W. Jian, A. J. Bennett, and J. M. Xu, Applied Physics Letters 79, 1039 (2001).

What is claimed is:

1. A method for preparing Angstrom-scale metal nanowire arrays by using zeolite crystals as templates, comprising steps of:
    obtaining zeolite crystals having an AFI type of zeolite structure and comprising aluminum oxide ($Al_2O_3$), phosphorus pentoxide ($P_2O_5$), and silicon dioxide $SiO_2$;
    mixing molten metal and the zeolite crystals to give a mixture;
    heating the mixture under a first predetermined condition(s); and
    cooling down the mixture to obtain Angstrom-scale metal nanowire arrays.

2. The method according to claim 1, wherein the molten metal is gallium (Ga) and the mixture is heated at a temperature of about 80° C. under a pressure smaller than 100 bar.

3. The method according to claim 1, wherein the molten metal is zinc (Zn) and the mixture is heated at a temperature of about 500° C. under a pressure smaller than 100 bar.

4. The method according to claim 1, wherein the cooling down the mixture comprises cooling down the mixture by liquid nitrogen.

5. The method according to claim 1, wherein the Angstrom-scale metal nanowire arrays obtained has an average diameter smaller than 1 nm.

6. The method according to claim 1, wherein the molten metal is aluminum.

7. The method according to claim 6, wherein the method of mixing the molten metal and the zeolite crystals comprises mixing the molten metal and the zeolite crystals with a predetermined weight ratio to give the mixture.

8. The method according to claim 7, wherein the predetermined weight ratio of zeolite crystals and molten metal is about 1:9.

9. The method according to claim 7, further comprising, after heating the mixture under the first predetermined condition(s) and before cooling down the mixture to obtain Angstrom-scale metal nanowire arrays:
    cooling the mixture and heating the cooled-down mixture under a second predetermined condition(s).

10. The method according to claim 9, wherein the heating the mixture under a second predetermined condition(s) comprises heating the mixture at a temperature in a range between about 660° C. and about 900° C. under a pressure in a range between 100 Torr and about 1600 Torr for about 3 hours in an inert gas atmosphere.

11. The method according to claim 10, wherein the temperature is in a range between about 750° C. and about 850° C.

12. The method according to claim 10, wherein the pressure is about 800 Torr.

13. The method according to claim 9, wherein the heating the mixture under a first predetermined condition(s) comprises heating the mixture at a temperature of about 800° C. under a pressure of about 400 Torr for about 6 hours in an oxygen atmosphere.

14. The method according to claim 6, wherein the Angstrom-scale aluminum nanowire arrays obtained has an average diameter smaller than 1 nm.

15. The method according to claim 1, wherein the heating the mixture under a first predetermined condition(s) comprises heating the mixture at a temperature of about 800° C. under a pressure of about 400 Torr for about 6 hours in an oxygen atmosphere.

* * * * *